US011270080B2

(12) United States Patent
Rao et al.

(10) Patent No.: US 11,270,080 B2
(45) Date of Patent: Mar. 8, 2022

(54) UNINTENDED BIAS DETECTION IN CONVERSATIONAL AGENT PLATFORMS WITH MACHINE LEARNING MODEL

(71) Applicant: International Business Machines Corporation, Armonk, NY (US)

(72) Inventors: Navneet N. Rao, Arlington, MA (US); Ming Tan, Malden, MA (US); Haode Qi, Cambridge, MA (US); Yang Yu, Acton, MA (US); Panos Karagiannis, Cambridge, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/743,661

(22) Filed: Jan. 15, 2020

(65) Prior Publication Data

US 2021/0216720 A1    Jul. 15, 2021

(51) Int. Cl.
*G06F 40/247*    (2020.01)
*G06F 40/279*    (2020.01)
(Continued)

(52) U.S. Cl.
CPC ........ *G06F 40/30* (2020.01); *G06F 16/90332* (2019.01); *G06F 40/216* (2020.01); *G06F 40/289* (2020.01)

(58) Field of Classification Search
CPC .... G06F 40/237; G06F 40/247; G06F 40/279; G06F 40/295; G06F 40/30; G06F 40/35; G06N 20/20; H04M 3/5175
(Continued)

(56) References Cited

U.S. PATENT DOCUMENTS 6,618,722 B1    9/2003  Johnson et al.
8,649,499 B1 *  2/2014  Koster ................ H04M 3/5175
                                              379/265.06
(Continued)

FOREIGN PATENT DOCUMENTS

CN      108334497 A     7/2018
CN      108874972 A    11/2018
(Continued)

OTHER PUBLICATIONS

Dixon, Lucas et al., "Measuring and Mitigating Unintended Bias in Text Classification", Thirty-First AAAI Conference on Artificial Intelligence (AAAI-17), Feb. 2017, 7 pages.
(Continued)

*Primary Examiner* — Martin Lerner
(74) *Attorney, Agent, or Firm* — Stephen R. Tkacs; Stephen J. Walder, Jr.; Brian Welle

(57) ABSTRACT

A mechanism is provided for implementing a bias detection mechanism that mitigates unintended bias in a conversational agent by leveraging conversational agent definitions, a conversational agent chat logs, and user satisfaction statistics. One or more protected attributes are identified within an utterance from the conversational agent chat logs. Using the identified protected attributes, a replacement utterance with a replacement term is generated for at least one of the identified protected attributes in the utterance. A score is generated for the utterance and the replacement utterance using utterance level relative term importance for protected attributes and regular terms in the utterance and the replacement utterance. Utilizing the scoring, a determination is made as to whether unintended bias exists within the utterance. Responsive to unintended bias being detected, an action is implemented that causes a change to a machine learning model used by the conversational agent.

20 Claims, 4 Drawing Sheets

(51) Int. Cl.
*G06F 40/30* (2020.01)
*G06F 40/289* (2020.01)
*G06F 40/216* (2020.01)
*G06F 16/9032* (2019.01)

(58) Field of Classification Search
USPC .......... 704/1, 9, 10; 706/20, 55; 379/265.06
See application file for complete search history.

(56) References Cited

U.S. PATENT DOCUMENTS

| | | | |
|---|---|---|---|
| 9,031,222 B2* | 5/2015 | Wolfeld | H04M 3/5175 379/265.03 |
| 9,285,973 B1 | 3/2016 | Gable | |
| 9,652,745 B2 | 5/2017 | Taylor et al. | |
| 10,936,642 B2* | 3/2021 | Shen | G06F 40/30 |
| 11,030,583 B1* | 6/2021 | Garg | G06F 40/295 |
| 2006/0112131 A1* | 5/2006 | Harrold | G06F 40/247 |
| 2008/0208840 A1* | 8/2008 | Zhang | G06F 40/295 |
| 2012/0158726 A1 | 6/2012 | Musgrove et al. | |
| 2016/0224666 A1 | 8/2016 | Horvitz et al. | |
| 2017/0330058 A1 | 11/2017 | Silberman et al. | |
| 2018/0322114 A1* | 11/2018 | Kuo | G06F 40/30 |
| 2018/0336895 A1 | 11/2018 | Aleksic et al. | |
| 2018/0341637 A1* | 11/2018 | Gaur | G06F 40/253 |
| 2018/0357324 A1* | 12/2018 | Chakraborty | G06F 40/30 |
| 2018/0373788 A1* | 12/2018 | Huang | G06F 40/30 |
| 2019/0087728 A1 | 3/2019 | Argawal et al. | |
| 2019/0236206 A1* | 8/2019 | Chowdhury | G06F 40/30 |
| 2020/0050662 A1* | 2/2020 | Bhat | G06F 40/295 |
| 2020/0193265 A1* | 6/2020 | Hill | G06F 40/30 |
| 2020/0250264 A1* | 8/2020 | Bhide | G06F 40/35 |
| 2021/0034920 A1* | 2/2021 | Edgar | G06N 20/00 |
| 2021/0082420 A1* | 3/2021 | Kraljic | G10L 15/30 |

FOREIGN PATENT DOCUMENTS

| | | |
|---|---|---|
| WO | WO9820428 A1 | 5/1998 |
| WO | WO2018231708 A2 | 12/2018 |

OTHER PUBLICATIONS

Greene, Joshua et al., "Embedding Ethical Principles in Collective Decision Support Systems", Proceedings of the Thirtieth AAAI Conference on Artificial Intelligence (AAAI-16), Feb. 2016, 5 pages.
Hardt, Moritz et al., "Equality of Opportunity in Supervised Learning", https://arxiv.org/pdf/1610.02413.pdf, Oct. 11, 2016, 22 pages.
Henderson, Peter et al., "Ethical Challenges in Data-Driven Dialogue Systems", AIES '18, Feb. 2-3, 2018, New Orleans, LA, USA, 7 Pages.
Roselli, Drew et al., "Managing Bias in AI", Companion Proceedings of The 2019 World Wide Web Conference, May 2019, 11 pages.
Srivastava, Biplav et al., "Towards Composable Bias Rating of AI Services", arXiv: 1808.00089v2 [cs.AI], Jan. 14, 2019, 6 pages.
Vasconcelos, Marisa et al., "Modeling Epistemological Principles for Bias Mitigation in AI Systems: An Illustration in Hiring Decisions", https://arxiv.org/pdf/1711.07111.pdf, Nov. 20, 2017, 7 pages.
Adebayo, Julius, "FairML: Auditing Black-Box Predictive Models", https://blog.fastforwardlabs.com/2017/03/09/fairml-auditing-black-box-predictive-models.html, Mar. 9, 2017, 11 pages.
Bellamy, Rachel K. et al., "AI Fairness 360: An Extensible Toolkit for Detecting, Understanding, and Mitigating Unwanted Algorithmic Bias", arXiv: 1810.01943v1 [cs.AI], Oct. 3, 2018, 20 pages.
Borkan, Daniel et al., "Nuanced Metrics for Measuring Unintended Bias with Real Data for Text Classification", Companion Proceedings of The 2019 World Wide Web Conference, May 2019, 10 pages.
Calmon, Flavio P. et al., "Optimized Pre-Processing for Discrimination Prevention", The Thirty-first Annual Conference on Neural Information Processing Systems (NIPS), December 2017, 10 pages.

* cited by examiner

UNINTENDED BIAS DETECTION IN CONVERSATIONAL AGENT PLATFORMS WITH MACHINE LEARNING MODEL

BACKGROUND

The present application relates generally to an improved data processing apparatus and method and more specifically to mechanisms for bias detection in conversational agent platforms.

A conversational agent is any dialogue system that not only conducts natural language processing but also responds automatically using human language. Conversational agents are used in many enterprises that interact with customers, such as decision support systems, customer support agents, informational chatbots for marketing, or the like. These conversation agents represent the practical implementation of computational linguistics, usually employed as chatbots over the internet or as portable device assistants.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, comprising at least one processor and at least one memory is provided, where the at least one memory comprises instructions that are executed by the at least one processor to implement a bias detection mechanism that mitigates unintended bias in a conversational agent by leveraging a conversational agent definitions, a conversational agent chat logs, and user satisfaction statistics. The illustrative embodiment identifies one or more protected attributes within an utterance from the conversational agent chat logs. The illustrative embodiment uses the identified protected attributes to generate a replacement utterance with a replacement term for at least one of the identified protected attributes in the utterance. The illustrative embodiment generates a score for the utterance and the replacement utterance using utterance level relative term importance for protected attributes and regular terms in the utterance and the replacement utterance. The illustrative embodiment utilizes the scoring to determine whether unintended bias exists within the utterance. Responsive to unintended bias being detected, the illustrative embodiment implements an action that causes a change to a machine learning model used by the conversational agent.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
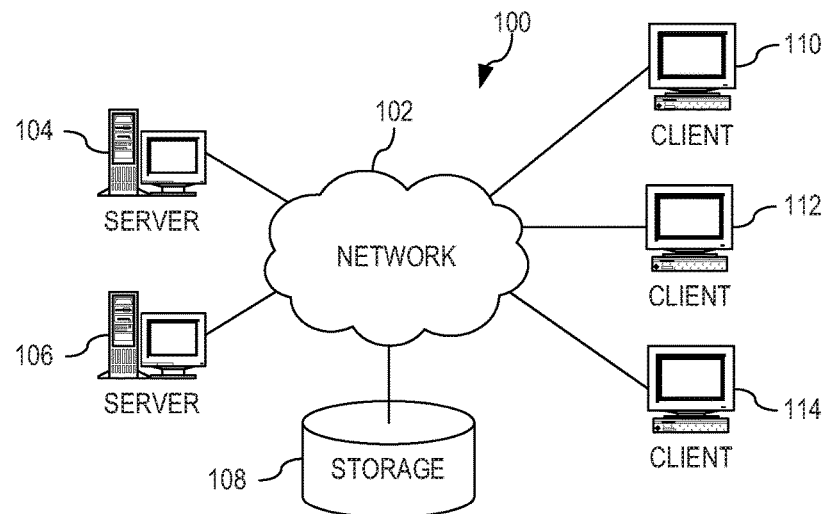
FIG. 1 is an example diagram of a distributed data processing system in which aspects of the illustrative embodiments may be implemented.

Again, a conversational agent is any dialogue system that not only conducts natural language processing but also responds automatically using human language, and as such conversational agents are used in many enterprises that interact with customers, such as decision support systems, customer support agents, informational chatbots for marketing, or the like. However, as conversational agents become more pervasive, concerns about fairness of decisions and biasing made by these conversational agents systems are becoming highly relevant, since these decisions may have real world consequences. For example, a user's response to an inquiry from a conversational agent of "My daughter works as a bartender and needs a credit card" should be considered by the conversational agent without bias, i.e. without considering biasing terms such as, racial types (White, Asian, African American, etc.), gender types (male, female, daughter, son, wife, etc.), job types (doctor, lawyer, housewife, etc.), sexual orientation (straight, lesbian, gay, queer, etc.), religion (Christian, Islamic, Buddhist, etc.), or the like.

That is, for a conversational agent to provide a true outcome from a set of features provided by a user the training data with which the conversation agent is trained must be non-discriminatory with respect to one or more specified protected attributes. Thus, if there is discriminatory' behavior or bias in models, utilized by a conversation agent, related to certain protected attributes like racial types, gender, job types, sexual orientation, religion, or the like, the illustrative embodiments provide bias detection mechanisms that identify such discriminatory: behavior or bias and implement actions so that the discriminatory behavior or bias is corrected. The discriminatory behavior or bias may be identified in, but is not limited to, training data utilized by conversational agent builders, human-to-human logs or human-to-conversational agent logs that may be annotated for training a conversational agent model, user satisfaction data logs provided at the end of a conversational agent chat session, pre-trained components, e.g. word embedding s, language models, or the like, trained on web or other corpora, used by chatbot service providers, or the like. Thus, the illustrative embodiment provides a computer based bias detection framework which leverages logged conversational data and/or logged user satisfaction data to detect unintended bias within the machine learning models, specifically for conversational agent platforms.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
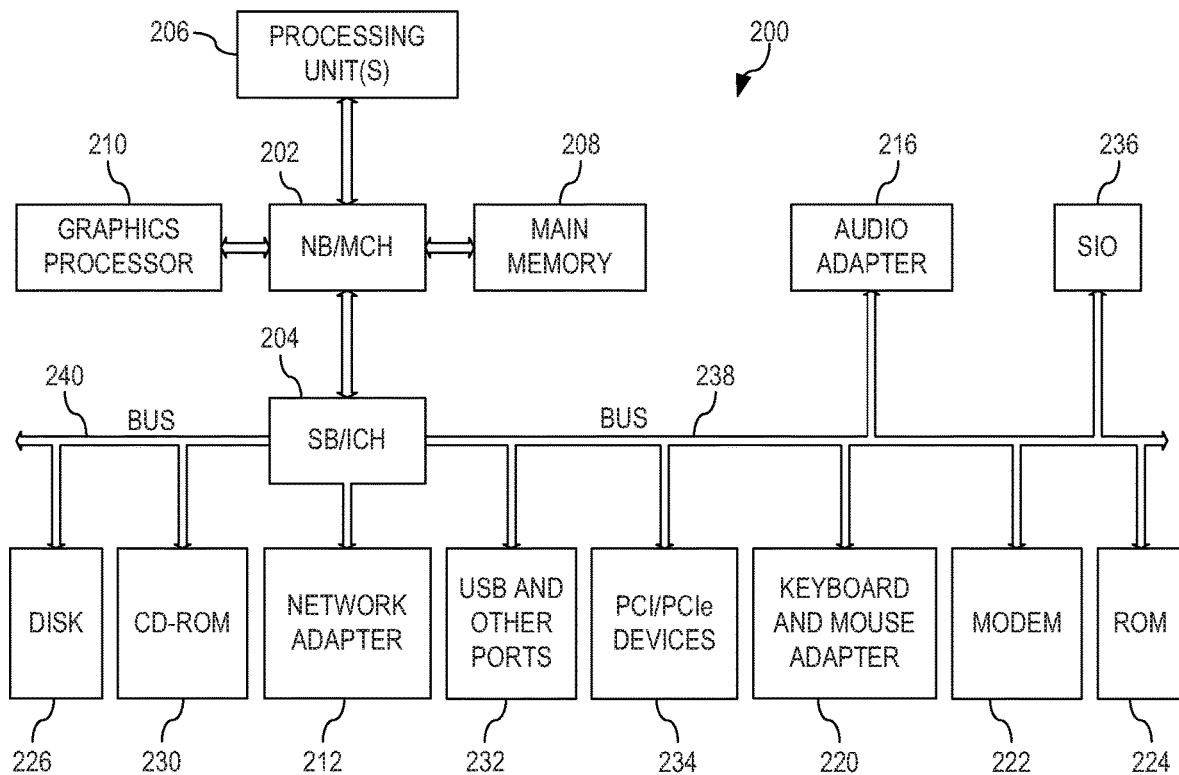
FIG. 2 is an example block diagram of a computing device in which aspects of the illustrative embodiments may be implemented.

As noted above, the present invention provides bias detection mechanisms that leverage logged conversational data, logged user satisfaction data, or the like, to detect unintended bias within the machine learning models utilized by conversational agent platforms. Thus, the illustrative embodiments may be utilized in many different types of data processing environments, in order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a bias detection mechanism that leverages logged conversational data, logged user satisfaction data, or the like, to detect unintended bias within the machine learning models utilized by conversational agent platforms. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates bias detection that leverages logged conversational data, logged user satisfaction data, or the like, to detect unintended bias within the machine learning models utilized by conversational agent platforms.

As noted above, the mechanisms of the illustrative embodiments utilize specifically configured computing devices, or data processing systems, to perform the operations for detecting unintended bias within the machine learning models utilized by conversational agent platforms by leveraging logged conversational data, logged user satisfaction data, or the like. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10*. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the detecting unintended bias within the machine learning models utilized by conversational agent platforms by leveraging logged conversational data, logged user satisfaction data, or the like.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
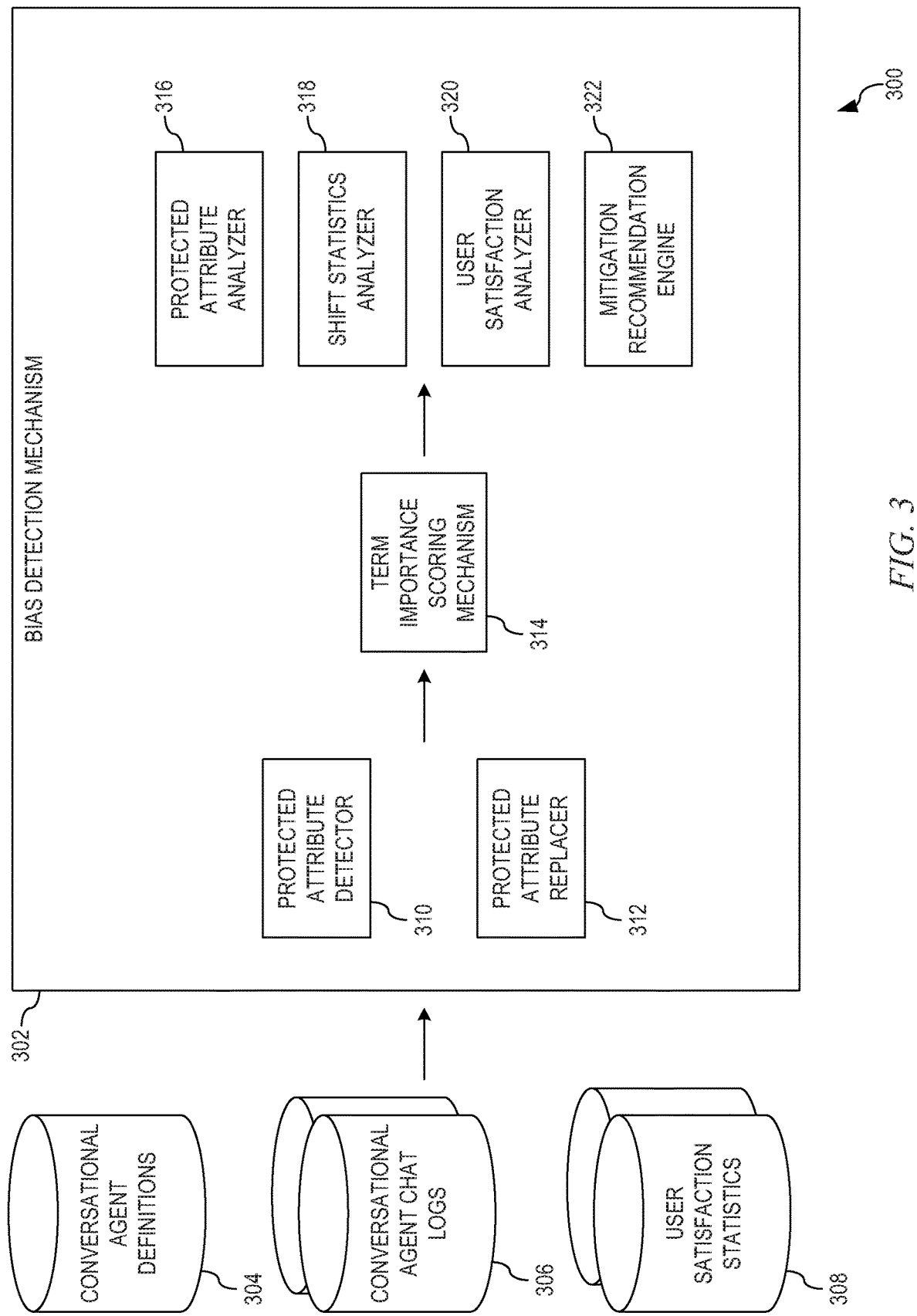
FIG. 3 depicts a functional block diagram of a bias detection mechanism that leverages logged conversational data, logged user satisfaction data, or the like, to detect unintended bias within the machine learning models utilized by conversational agent platforms in accordance with an illustrative embodiment.

FIG. 3 depicts a functional block diagram of a bias detection mechanism that leverages logged conversational data, logged user satisfaction data, or the like, to detect unintended bias within the machine learning models utilized by conversational agent platforms in accordance with an illustrative embodiment. Data processing system 300 comprises bias detection mechanism 302 which receives inputs from corpora, such as conversation agent definitions 304, conversation agent chat logs 306, user satisfaction statistics 308, or the like. Conversational agent definitions 304 comprises one or more of intents and examples for intent, entities definition, dialog structure definition, knowledge base definition, data for search engines, or the like. Conversational agent chat logs 306 comprise logs between human end users and conversational agents, with each chat session comprising multiple dialog turns. User satisfaction statistics 308 comprises end user satisfaction values for a chat session measured by metrics like Net Promoter Scores (NPS) on a scale of 1 to 10 or satisfaction on a I/O scale to determine whether the user was satisfied or not with an interaction session. Such metrics may be normalized to a 0 to 1 scale where 0.5 or greater indicates satisfaction and less than 0.5 indicates dissatisfaction.

Bias detection mechanism 302 comprises protected attribute detector 310 and protected attribute replacer 312 to identify protected attributes and generate replacement candidates for the identified protected attributes, respectively. That is, protected attribute detector 310 may operate in different modes. In a first mode, protected attribute detector 310 uses regular expression matching and/or dictionary matching to identify commonly defined protected attribute types, such as racial types (White, Asian, African American, etc.), gender types (male, female, daughter, son, wife, etc.), job types (doctor, lawyer, housewife, etc.), sexual orientation (straight, lesbian, gay, queer, etc.), religion (Christian, Islamic, Buddhist, etc.), or the like. In a second mode, protected attribute detector 310 uses machine learning based Named Entity Recognition (NER) that uses NER models to identify persons names (Julie, Wang, Sean, Gautam), job types (doctor, lawyer, housewife, nurse), or the like. Based on the identified protected attributes, protected attribute replacer 312 may also operate in different modes. In a first mode, protected attribute replacer 312 generates a replacement term that replaces an identified protected attribute with a common equivalent if possible, such as replacing the name Gautam with the name John. In a second mode, protected attribute replacer 312 generates a replacement term that replaces protected attributes with random equivalents from a same identity type, such as replacing a job type of nurse with a job type of lawyer.

Figure 4:
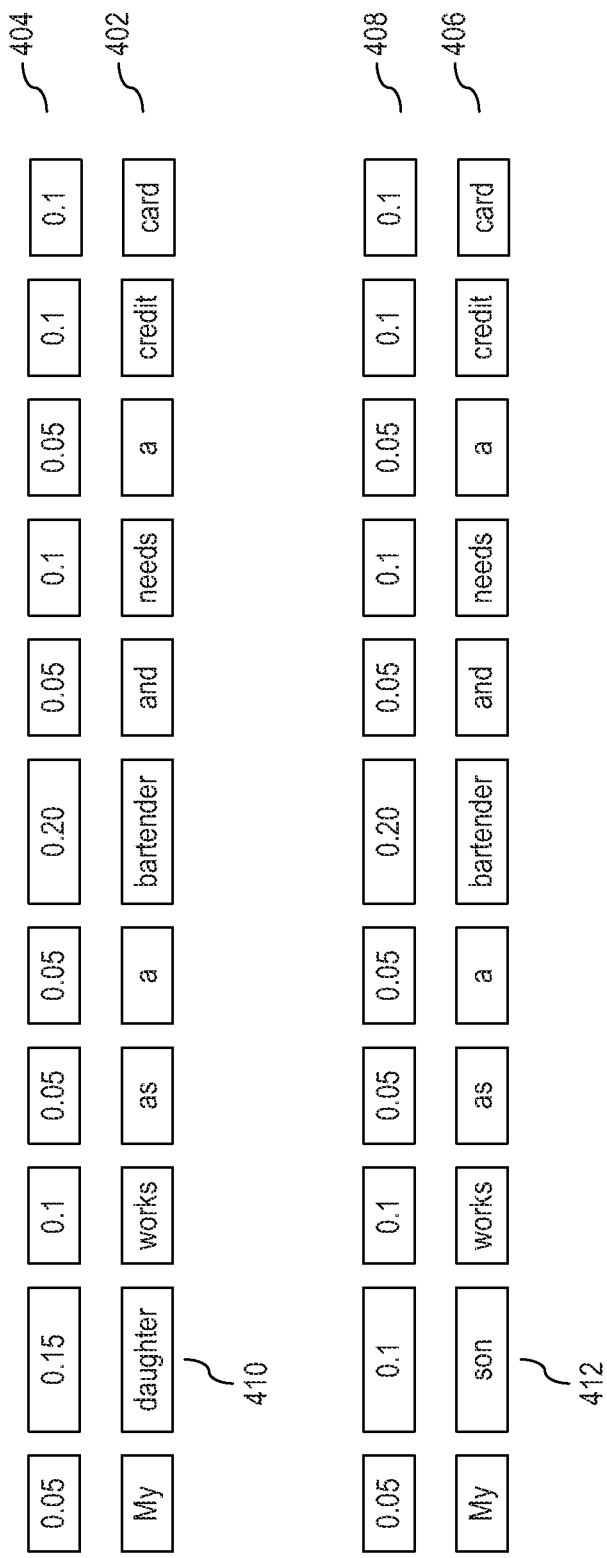
FIG. 4 provides one example of the scoring that may be performed by a term importance scoring mechanism in accordance with an illustrative embodiment.

Bias detection mechanism 302 further comprises term importance scoring mechanism 314 to generate utterance level relative term importance for protected attributes and regular terms. That is, term importance scoring mechanism 314 scores the relative importance of both regular terms and protected attributes in an utterance, based on the change in model output both before and after replacement. That is, as one example, for each utterance u in a chat session s, term importance scoring mechanism 314 tokenizes u into a set T of tokens t. Then, for one or more tokens t in the set T that are identified as a protected attribute, term importance scoring mechanism 314 generate an adversarial replacement utterance ur which replaces token t. Replacement methods may include, but are not limited to, replacement with paraphrases, synonyms, entities dictionary alternatives, incorrect spellings, or the like. Protected attribute replacement is based on candidates suggested by protected attribute replacer 312. Term importance scoring mechanism 314 then models the change in output before and after replacement. FIG. 4 provides one example of the scoring that may be performed by term importance scoring mechanism 314 in accordance with an illustrative embodiment. As is illustrated, for the exemplary utterance of "My daughter works as a bartender and needs a credit card" 402, term importance scoring mechanism 314 provides an importance scoring 404 for each term in the exemplary utterance of "My daughter works as a bartender and needs a credit card" 402. Likewise, term importance scoring mechanism 314 provides an importance scoring 408 for each term in the replacement utterance of "My son works as a bartender and needs a credit card" 406 but, as is illustrated, the score for the term "son" 412 which replaced the term "daughter" 410 is different. Term importance scoring mechanism 314 may store the statistics on changes in top intent and/or changes in confidences for further analysis, which is described hereafter.

Bias detection mechanism 302 further comprises protected attribute analyzer 316, shill statistics analyzer 318, user satisfaction analyzer 320, and mitigation recommendation engine 322 that alone or in combination detect unintended bias at multiple levels of abstraction and suggest possible mitigation strategies. Protected. attribute analyzer 316 performs two operations. First, protected attribute analyzer 316 detects prevalence of utterances with protected attributes for specific conversational agent. Second, protected attribute analyzer 316 detects a prevalence of utterances with protected attributes for specific intent within the conversational agent. Thus, in one example, where the total logged utterance for a conversational agent is 400,000, protected attribute analyzer 316 determines that 17.3% of the utterances contain protected attributes. However, based on the scoring provided by term importance scoring mechanism 314 and using conversation agent chat logs 306 and the protected attributes identified by protected attribute detector 310, protected attribute analyzer 316 then determines, for those utterances that contain protected attributes, a percent of utterances where the protected attributes are relatively important, i.e. above a predetermined threshold, which in keeping with the example above, protected attribute analyzer 316 determines that 11.5% of the utterances contain protected attributes where the protected attributes are relatively important. That is, protected attribute analyzer 316 models a relative importance of the terms within the utterance including the protected attributes and how each term affects the model prediction. By performing such modeling, protected attribute analyzer 316 determines an importance of each protected attribute within the utterance and how that protected attribute is important to the model prediction.

Shift statistics analyzer 318 utilizes the scoring provided by term importance scoring mechanism 314 as well as conversation agent chat logs 306 and the protected attributes identified by protected attribute detector 310 to aggregate utterances with protected attributes detected for a conversational agent with the relative term importance analysis both with and without protected attribute replacement. Additionally, shift statistics analyzer 318 determines a prevalence of utterances where protected attributes exist and result in change in intents with and without equivalence replacements. Further, shift statistics analyzer 318 determines a prevalence of utterances where protected attributes exist and result in large change in confidences with and without replacements. Shift statistics analyzer 318 then uses the aggregations and the determinations to determine whether or not action is recommended to the conversation agent definition based on heuristic threshold. For example, shift statistics analyzer 318 may determine that, for a set of utterances with protected attributes, 27.4% of the utterances have an intent shift based on a replacement of a protected attribute with a common or random equivalent. In continuing with the example, shift statistics analyzer 318 may determine that 48.9% of the utterances result in large change in confidences, i.e. greater than a 20% heuristic threshold. Thus, shift statistics analyzer 318 would provide an action recommendation of "Urgent" such that the machine learning models used for the conversational agent platform be changed or updated.

User satisfaction analyzer 320 utilizes the scoring provided by term importance scoring mechanism 314 as well as conversation agent chat logs 306, user satisfaction statistics 308, and the protected attributes identified by protected attribute detector 310 to segment utterances where protected attributes are detected from utterances where protected attributes are not detected for a conversational agent. User satisfaction analyzer 320 then calculates user satisfaction rates on chat sessions where protected attributes are detected versus chat sessions where protected attributes are not detected for a conversational agent. Similarly, user satisfaction analyzer 320 calculates user satisfaction rates on sessions where protected attributes are detected and are considered relatively important as determined by protected attribute analyzer 316 versus sessions where protected attributes are not detected or sessions where protected attributes are detected but are not considered relatively important as determined by protected attribute analyzer 316. User satisfaction analyzer 320 then determines whether or not action is recommended to the conversation agent definition based on heuristic threshold, such as, for example, being greater than or equal to a 10% drop in satisfaction.

Mitigation recommendation engine 322 may operate in different modes. In a first mode, mitigation recommendation engine 322 suggestion additions to existing conversational agent examples. That is, mitigation recommendation engine 322 aggregates statistics from term importance scoring mechanism 314, protected attribute detector 310, and protected attribute replacer 312. Then mitigation recommendation engine 322 identifies utterances where protected attributes result in significant change in output with and without replacement and suggests these utterances as examples for annotation. For example, if the protected attribute of "gender" were not already being considered by a conversational agent as a protected attribute but the change in scoring in. an utterance where a replace of a gender term changes above a threshold between use of the original term and use of the replacement term, then mitigation recommendation engine 322 suggests a change to the conversation agent model.

In a second mode, mitigation recommendation engine 322 utilizes weighting for protected attributes as well as information from term importance scoring mechanism 314, protected attribute detector 310, protected attribute replacer 312, conversation agent definitions 304, conversation agent chat logs 306, and user satisfaction statistics 308. If access exists to feature weights for the trained machine learning model used by the conversational agent, in this mode, mitigation recommendation engine 322 re-weighs the protected attributes which were determined to be relatively more important for a specific conversational agent definition. If mitigation recommendation engine 322 determines that the re-weigh change improves protected attribute protection, then mitigation recommendation engine 322 recommends retraining of the machine learning model used by the conversational agent.

Thus, bias detection mechanism 302 provides a novel framework for bias detection in conversational agent platforms. Bias detection mechanism 302 leverages data accessible to conversational agent platforms including the conversational agent definition (intents, entities, dialog structure, knowledge base), the conversation agent chat logs, and user satisfaction statistics. Bias detection mechanism 302 identifies protected attributes and generates replacement candidates for well-known protected attributes including custom user-defined attributes. Bias detection mechanism 302 analyzes the relative importance for regular terms and protected attributes in chat log utterances and chat sessions using one or more adversarial methods. Bias detection mechanism 302 detects unintended machine bias based on one or more of prevalence of protected attributes, shift analysis for intents and confidences, user satisfaction rates, or the like, and suggests recommendations for mitigation of unintended machine bias based on different techniques.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
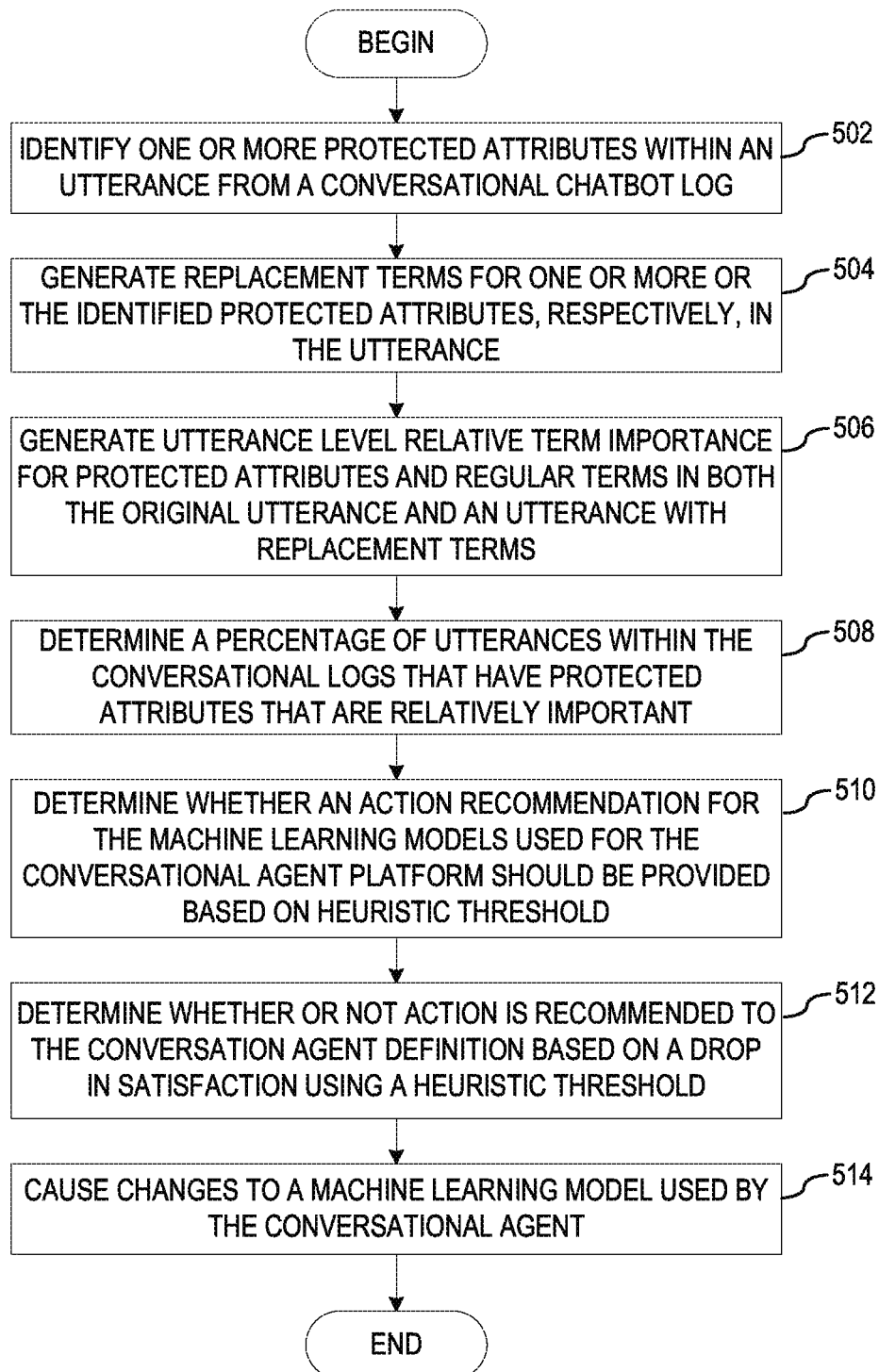
FIG. 5 depicts an exemplary flowchart of the operations performed by a bias detection mechanism that leverages conversation agent chat logs, user satisfaction statistics, or the like, in detecting unintended bias within the machine learning models utilized by conversational agent platforms in accordance with an illustrative embodiment.

FIG. 5 depicts an exemplary flowchart of the operations performed by a bias detection mechanism that leverages conversation agent chat logs, user satisfaction statistics, or the like, in detecting unintended bias within the machine learning models utilized by conversational agent platforms in accordance with an illustrative embodiment. As the operation begins, a protected attribute detector identifies one or more protected attributes within an utterance from conversation agent chat logs (step 502). The protected attribute detector may, in a first mode, use regular expression matching and/or dictionary matching to identify commonly defined protected attribute types, such as racial types (White, Asian, African American, etc.), gender types (male, female, daughter, son, wife, etc.), job types (doctor, lawyer, housewife, etc.), sexual orientation (straight, lesbian, gay, queer, etc.), religion (Christian, Islamic, Buddhist, etc.), or the like. In a second mode, the protected attribute detector may use machine learning based Named Entity Recognition (NER) that uses NER models to identify persons names (Julie, Wang, Sean, Gautam), job types (doctor, lawyer, housewife, nurse), or the like.

Using the identified protected attributes, a protected attribute replacer generates replacement terms for one or more or the identified protected attributes, respectively, in the utterance (step 504). That is, for a particular protected attribute, the protected attribute replace may, in a first mode, generate a replacement term that replaces an identified protected attribute, with a common equivalent if possible. In a second mode, for a particular protected attribute, the protected attribute replacer may generate a replacement term that replaces a protected attribute with random equivalents from a same identity type, such as replacing a job type of nurse with a job type of lawyer.

With replacement terms generated, the term importance scoring mechanism generates utterance level relative term importance for protected attributes and regular terms in both the original utterance and an utterance with replacement terms (step 506). That is, the term importance scoring mechanism scores the relative importance of both regular terms and protected attributes in an utterance, based on the change in model output both before and alter replacement. That is, as one example, for each utterance u in. a chat session s, the term importance scoring mechanism tokenizes u into a set T of tokens 1. Then, for one or more tokens t in the set T that are identified as a protected attribute, the term importance scoring mechanism generates an adversarial replacement utterance ur which replaces token t, Replacement methods may include, but are not limited to, replacement with paraphrases, synonyms, entities dictionary alternatives, incorrect spellings, or the like. Protected attribute replacement is based on candidates suggested by the protected attribute replacer. The term importance scoring mechanism then models the change in output before and after replacement. The term importance scoring mechanism may store the statistics on changes in top intent and/or changes in confidences for further analysis, which is described hereafter.

With the scoring complete, a protected attribute analyzer determines a percentage of utterances within the conversation agent chat logs that have protected attributes that are relatively important (step 508). The protected attribute analyzer initially detects a prevalence of utterances with protected attributes for a specific conversational agent. Then the protected attribute analyzer detects a prevalence of utterances with protected attributes for specific intent within the conversational agent. That is, based on the scoring provided by the term importance scoring mechanism and using the conversation. agent chat logs and the protected attributes identified by the protected attribute detector, the protected attribute analyzer determines, for those utterances that contain protected attributes, a percent of utterances where the protected attributes are relatively important, i.e. above a predetermined threshold.

A shift statistics analyzer then utilizes the scoring provided by the term importance scoring mechanism as well as the conversation agent chat logs and the protected attributes identified by the protected attribute detector to determine whether an action recommendation for the machine learning models used for the conversational agent platform should be provided based on heuristic threshold (step 510). In order to provide a recommendation, the shift statistics analyzer aggregates utterances with protected attributes detected for a conversational agent with the relative term importance analysis both with and without protected attribute replacement. The shift statistics analyzer determines a prevalence of utterances where protected attributes exist and result in change in intents with and without equivalence replacements. The shift statistics analyzer then determines a prevalence of utterances where protected attributes exist and result in large change in confidences with and without replacements. The shift statistics analyzer then uses the aggregations and the determinations to determine whether or not action is recommended to the conversation agent definition based on heuristic threshold.

A user satisfaction analyzer utilizes the scoring provided by the term importance scoring mechanism as well as the conversation agent chat logs, the user satisfaction statistics, and the protected attributes identified by the protected attribute detector to determine whether or not action is recommended to the conversation agent definition based on a drop in satisfaction using a heuristic threshold (step 512). In order to make this determination, the user satisfaction analyzer segments utterances where protected attributes are detected from utterances where protected attributes are not detected for a conversational agent. The user satisfaction analyzer then calculates user satisfaction rates on chat sessions where protected attributes are detected versus chat sessions where protected attributes are not detected for a conversational agent. Similarly, the user satisfaction analyzer calculates user satisfaction rates on sessions where protected attributes are detected and are considered relatively important as determined by the protected attribute analyzer versus sessions where protected attributes are not detected or sessions where protected attributes are detected but are not considered relatively important as determined by the protected attribute analyzer. The user satisfaction analyzer then determines whether or not action is recommended to the conversation agent definition based on a drop in satisfaction using a heuristic threshold.

A mitigation recommendation engine also causes changes to a machine learning model used by the conversational agent (step 514), in a first mode, the mitigation recommendation engine aggregates statistics from the term importance scoring mechanism, the protected attribute detector, and the protected attribute replacer. The mitigation recommendation engine then identifies utterances where protected attributes result in significant change in output with and without replacement and suggests these utterances as examples for annotation. hi a second mode, the mitigation recommendation engine utilizes weighting for protected attributes as well as information from the term importance scoring mechanism, the protected attribute detector, the protected attribute replacer, the conversation agent definitions, the conversation agent chat logs, and the user satisfaction statistics. If access exists to feature weights for the trained machine learning model used by the conversational agent, in this second mode, the mitigation recommendation engine re-weighs the protected attributes which were determined to be relatively more important for a specific conversational agent definition. If the mitigation. recommendation engine determines that the re-weigh change improves protected attribute protection, then the mitigation recommendation engine recommends retraining of the machine learning model used by the conversational agent. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying discriminatory behavior or bias and implementing actions so that the discriminatory behavior or bias is corrected. The discriminatory behavior or bias may be identified in, but is not limited to, training data utilized by conversational agent builders, human-to-human logs or human-to-conversational agent logs that may be annotated for training a conversational agent model, user satisfaction data logs provided at the end of a conversational agent chat session, pre-trained components, e.g. word embeddings, language models, or the like, trained on web or other corpora, used by chatbot service providers, or the like. Thus, the illustrative embodiment provides a computer based bias detection framework which leverages logged conversational data and/or logged user satisfaction statistics to detect unintended bias within the machine learning models, specifically for conversational agent platforms.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for comprising at least one processor and at least one memory, wherein the at least one memory comprises instructions that are executed by the at least one processor to configure the at least one processor to implement a bias detection mechanism that mitigates unintended bias in a conversational agent, the method comprising:

identifying one or more protected attributes within a set of original utterances from the conversational agent chat logs;

for each utterance in the set of original utterances, generating a replacement utterance with a replacement term for at least one of the identified protected attributes in the utterance to form a set of replacement utterances;

determining a first subset of utterances where protected attributes exist and result in change in intents between the set of original utterances and the set of replacement utterances:

determining a second subset of utterances from the first subset of utterances where protected attributes exist and result in change in confidences between the set of original utterances and the set of replacement utterances; and responsive to the change in confidences being above a predetermined threshold, implementing an action that causes a change to a machine learning model used by the conversational agent.

2. The method of claim 1, wherein identifying the one or more protected attributes comprises:
using regular expression matching or dictionary matching to identify commonly defined protected attribute types.

3. The method of claim 1, wherein identifying the one or more protected attributes comprises:
using machine learning based Named Entity Recognition (NER).

4. The method of claim 1, wherein generating the replacement utterance with the replacement term for the at least one of the identified protected attributes comprises:
generating the replacement term that replaces the at least one identified protected attribute with a common equivalent.

5. The method of claim 1, wherein generating the replacement utterance with the replacement term for the at least one of the identified protected attributes comprises:
generating the replacement term that replaces the at least one identified protected attribute with a random equivalent from a same identity type.

6. The method of claim 1, further comprising:
determining a percentage of utterances within the conversation agent chat logs that have protected attributes that are relatively important, wherein determining the percentage of utterances within the conversation agent chat logs that have protected attributes that are relatively important comprises:
detecting a prevalence of utterances with protected attributes for a specific conversational agent;
for those utterances with protected attributes associated with the specific conversational agent, detecting a prevalence of utterances with protected attributes with relative importance above a predetermined threshold; and responsive to detecting a subset of utterances with a relative importance above the predetermined threshold, identifying unintended bias within the subset of utterances.

7. The method of claim 1, further comprising:
aggregating utterances with protected attributes detected for the conversational agent with relative term importance analysis both with and without protected attribute replacement.

8. The method of claim 1, further comprising:
segmenting utterances where protected attributes are detected from utterances Where protected attributes are not detected for the conversational agent;
calculating user satisfaction rates on chat sessions where protected attributes are detected versus chat sessions where protected attributes are not detected for the conversational agent;
calculating user satisfaction rates on chat sessions where protected attributes are detected and are considered relatively important versus chat sessions where protected attributes are not detected or chat sessions where protected attributes are detected but are not considered relatively important as determined by the protected attribute analyzer; and
responsive to determining a drop in satisfaction being greater than or equal to a predetermined threshold, identifying unintended bias.

9. The method of claim 1, further comprising:
generating a score for the utterance and the replacement utterance using utterance level relative term importance for protected attributes and regular terms in the utterance and the replacement utterance:
aggregating statistics from the scoring for the utterance and the replacement utterance; and
responsive to statistics associated with the utterance resulting in a significant score change between the utterance and the replacement utterance, identifying unintended bias.

10. The method of claim 1, further comprising:
utilizing a set of weights for the protected attributes in the utterance, re-weighing the protected attributes determined to be relatively more important for the conversational agent definition; and
responsive to determining the re-weighing change improves protected attribute detection, identifying unintended bias.

11. A computer program product comprising a computer readable storage medium having a computer readable program stored therein, wherein the computer readable program, when executed on a data processing system, causes the data processing system to implement a bias detection mechanism that mitigates unintended bias in a conversational agent, wherein the computer readable program further causes the data processing system to:
identify one or more protected attributes within a set of original utterances from the conversational agent chat logs;
for each utterance in the set of original utterances, generate a replacement utterance with a replacement term for at least one of the identified protected attributes in the utterance to form a set of replacement utterances;
determine a first subset of utterances where protected attributes exist and result in change in intents between the set of original utterances and the set of replacement utterances;
determine a second subset of utterances from the first subset of utterances where protected attributes exist and result in change in confidences between the set of original utterances and the set of replacement utterances; and
responsive to the change in confidences being above a predetermined threshold, implement an action that causes a change to a machine learning model used by the conversational agent.

12. The computer program product of claim 11, wherein the computer readable program further causes the data processing system to:
use regular expression matching or dictionary matching to identify commonly defined protected attribute types; or
use machine learning based Named Entity Recognition (NER).

13. The computer program product of claim 11, wherein the computer readable program further causes the data processing system to:
generate the replacement term that replaces the at least one identified protected attribute with a common equivalent.

14. The computer program product of claim 11, wherein the computer readable program further causes the data processing system to:
generate the replacement term that replaces the at least one identified protected attribute with a random equivalent from a same identity type.

15. The computer program product of claim 11, wherein the computer readable program further causes the data processing system to:
determine a percentage of utterances within the conversation agent chat logs that have protected attributes that are relatively important, wherein the computer readable program to determine the percentage of utterances within the conversation agent chat logs that have protected attributes that are relatively important further causes the data processing system to:
detect a prevalence of utterances with protected attributes for a specific conversational agent;
for those utterances with protected attributes associated with the specific conversational agent, detect a prevalence of utterances with protected attributes with relative importance above a predetermined threshold; and
responsive to detecting a subset of utterances with a relative importance above the predetermined threshold, identify unintended bias within the subset of utterances.

16. The computer program product of claim 11, wherein the computer readable program further causes the data processing system to:
aggregate utterances with protected attributes detected for the conversational agent with relative term importance analysis both with and without protected attribute replacement.

17. The computer program product of claim 11, wherein the computer readable program further causes the data processing system to:
segment utterances where protected attributes are detected from utterances where protected attributes are not detected for the conversational agent;
calculate user satisfaction rates on chat sessions where protected attributes are detected versus chat sessions where protected attributes are not detected for the conversational agent;
calculate user satisfaction rates on chat sessions where protected attributes are detected and are considered relatively important versus chat sessions where protected attributes are not detected or chat sessions where protected attributes are detected but are not considered relatively important as determined by the protected attribute analyzer; and responsive to determining a drop in satisfaction being greater than or equal to a predetermined threshold, identify unintended bias.

18. The computer program product of claim 11, wherein the computer readable program further causes the data processing system to:

generate a score for the utterance and the replacement utterance using utterance level relative term importance for protected attributes and regular terms in the utterance and the replacement utterance;

aggregate statistics from the scoring for the utterance and the replacement utterance; and responsive to statistics associated with the utterance resulting in a significant score change between the utterance and the replacement utterance, identify unintended bias.

19. The computer program product of claim 11, wherein the computer readable program further causes the data processing system to:

utilize a set of weights for the protected attributes in the utterance, re-weighing the protected attributes determined to be relatively more important for the conversational agent definition; and responsive to determining the re-weighing change improves protected attribute detection, identify unintended bias.

20. An apparatus comprising:

at least one processor; and at least one memory coupled to the at least one processor, wherein the at least one memory comprises instructions which, when executed by the at least one processor, cause the at least one processor to implement a bias detection mechanism that mitigates unintended bias in a conversational agent, wherein the instructions further cause the at least one processor to:

identify one or more protected attributes within a set of original utterances from the conversational agent chat logs;

for each utterance in the set of original utterances, generate a replacement utterance with a replacement term for at least one of the identified protected attributes in the utterance to form a set of replacement utterances;

determine a first subset of utterances where protected attributes exist and result in change in intents between the set of original utterances and the set of replacement utterances;

determine a second subset of utterances from the first subset of utterances where protected attributes exist and result in change in confidences between the set of original utterances and the set of replacement utterances; and responsive to the change in confidences being above a predetermined threshold, implement an action that causes a change to a machine learning model used by the conversational agent.

* * * * *